United States Patent
Bibeau et al.

(10) Patent No.: US 9,483,888 B2
(45) Date of Patent: Nov. 1, 2016

(54) REUSABLE ELECTRONIC SEAL

(75) Inventors: Eric Bibeau, Winnipeg (CA); Reza Ghorbani, Honolulu, HI (US)

(73) Assignee: University of Manitoba, Winnipeg, Manitoba (CA)

( * ) Notice: Subject to any disclaimer, the term of this patent is extended or adjusted under 35 U.S.C. 154(b) by 48 days.

(21) Appl. No.: 14/394,679

(22) PCT Filed: Apr. 16, 2012

(86) PCT No.: PCT/US2012/033770
§ 371 (c)(1),
(2), (4) Date: Oct. 30, 2014

(87) PCT Pub. No.: WO2013/158062
PCT Pub. Date: Oct. 24, 2013

(65) Prior Publication Data
US 2015/0091693 A1 Apr. 2, 2015

(51) Int. Cl.
*G07C 9/00* (2006.01)
*E05B 39/04* (2006.01)
(Continued)

(52) U.S. Cl.
CPC ....... *G07C 9/00015* (2013.01); *B65D 33/2591* (2013.01); *E05B 39/04* (2013.01);
(Continued)

(58) Field of Classification Search
CPC ...... E05B 39/00; E05B 39/005; E05B 83/10; E05B 39/04; E05B 45/005; G08B 13/1463; G08B 13/126; G08B 13/06; G08B 13/14; G09F 3/0329; G09F 3/0376; G09F 3/0304; G07C 9/00015; B65D 33/2591; B65D 2101/00; B65D 2203/10; B65D 2211/00; Y02W 30/807

USPC .................. 340/542, 556, 571, 539.22, 5.25
See application file for complete search history.

(56) References Cited

U.S. PATENT DOCUMENTS 380,616 A 4/1888 Bobrick
679,558 A 7/1901 Gays
(Continued)

FOREIGN PATENT DOCUMENTS

EP 1063627 B1 12/2005
EP 1774498 A1 4/2007
(Continued)

OTHER PUBLICATIONS

International Search Report and Written Opinion for PCT/US2012/033770 dated Dec. 4, 2014.
(Continued)

*Primary Examiner* — Ali Neyzari
(74) *Attorney, Agent, or Firm* — Pepper Hamilton LLP

(57) ABSTRACT

A container including a reusable electronic seal, as well as a system and method for using the electronic seal are described. The container includes a closure member configured to detachably affix to a portion of the container, thereby sealing the container. In response to the closure member sealing the container, a signal generating component generates an electronic signal and transmits the electronic signal to a processing circuit operably connected to the signal generating component. The processing circuit includes a processing device configured to generate a unique code when the closure member is manipulated to open or close the container and an output device operably connected to the processing device and configured to output the unique code. The unique code is updated each time the container is opened, thereby providing a recipient with a way to determine whether the container has been opened during delivery.

24 Claims, 3 Drawing Sheets

(51) Int. Cl.
*B65D 33/25* (2006.01)
*G09F 3/03* (2006.01)

(52) U.S. Cl.
CPC ........ *G09F 3/0394* (2013.01); *B65D 2101/00* (2013.01); *B65D 2203/10* (2013.01); *B65D 2211/00* (2013.01); *Y02W 30/807* (2015.05)

(56) References Cited

U.S. PATENT DOCUMENTS

| | | | |
|---|---|---|---|
| 1,354,092 A | 9/1920 | Crate | |
| 1,568,880 A | 1/1926 | Conklin | |
| 3,894,755 A | 7/1975 | Cieslak et al. | |
| 4,766,419 A | 8/1988 | Hayward | |
| 5,025,980 A | 6/1991 | Blackman | |
| 5,189,396 A | 2/1993 | Stobbe | |
| 5,400,957 A | 3/1995 | Stude | |
| 5,415,341 A | 5/1995 | Diamond | |
| 5,447,344 A | 9/1995 | Hayward | |
| 5,826,787 A | 10/1998 | Turner | |
| 5,918,983 A | 7/1999 | Palazzolo | |
| 5,950,916 A | 9/1999 | Santangelo | |
| 6,069,563 A * | 5/2000 | Kadner | G08B 13/06 340/539.1 |
| 6,296,179 B1 | 10/2001 | Wortman | |
| 6,753,775 B2 * | 6/2004 | Auerbach | E05B 39/00 340/426.16 |
| 7,239,238 B2 | 7/2007 | Tester et al. | |
| 7,270,353 B2 * | 9/2007 | Sironi | G06K 19/07798 292/307 R |
| 7,782,200 B1 | 8/2010 | Fleischmann | |
| 8,083,808 B2 * | 12/2011 | Scheidt | H04L 9/00 340/5.6 |
| 8,319,640 B2 * | 11/2012 | McGinnis | E05B 45/06 340/551 |
| 8,427,422 B2 * | 4/2013 | Soh | G06F 3/016 345/156 |
| 2004/0041705 A1 | 3/2004 | Auerbach et al. | |
| 2005/0231365 A1 | 10/2005 | Tester et al. | |
| 2007/0046627 A1 | 3/2007 | Soh et al. | |
| 2007/0262850 A1 | 11/2007 | Willgert | |

FOREIGN PATENT DOCUMENTS

| | | |
|---|---|---|
| WO | WO 02/33682 A2 | 4/2002 |
| WO | WO 2013/158062 A2 | 10/2013 |

OTHER PUBLICATIONS

SCS Technologies for Container Integrity: Container security devices and seals, accessed at http://web.archive.org/web/20141016103640/http://siteresources.worldbank.org/INTTRANSPORT/Resources/336291-1239112757744/5997693-1252703593834/6433604-1256564181444/6505010-1256582144983/seals.pdf, accessed on Oct. 16, 2014, pp. 1-10.

Manta, Reusable seal with memory download, accessed at http://www.reusable-seals.org.uk/Manta-seal/Manta.aspx, accessed on Oct. 16, 2014, pp. 1-3.

\* cited by examiner

REUSABLE ELECTRONIC SEAL

CROSS-REFERENCE TO RELATED APPLICATION

This application is a U.S. National Stage filing under 35 U.S.C. §371 of International Application No. PCT/US2012/033770, filed on Apr. 16, 2012 and entitled "REUSABLE ELECTRONIC SEAL", the contents of which are incorporated by reference in their entirety.

BACKGROUND

Secure containers are typically used to transport items from a sender to a recipient. Typically, secure containers include a mechanical locking mechanism to securely seal the container against theft or tampering. Electronic locking or sealing mechanisms provide an additional level of security. Some electronic locking mechanisms provide a memory for recording time values when the locking mechanism changes states, i.e., is locked or unlocked. By examining these time values, a recipient can confirm whether the container was opened between the time the sender locked the container and the time the recipient opened the container.

The use of reusable containers for delivery of items provides for multiple uses of the same container for multiple deliveries, thereby reducing waste and pollution associated with the manufacture of single use containers such as envelopes. A multi-use envelope typically includes a table on which a sender can write a recipient's name. Once the recipient receives the multi-use envelope, they can cross out their name and use the next line in the table for the next recipient. While reducing the waste of single-use envelopes, multi-use envelopes do not provide confidentiality to the sender or the recipient. Breakable seals may be used to secure a multi-use envelope. The disadvantage of this system is that the seals can only be used once. Security and confidentiality problems also occur with sealed single-use envelopes. Someone may intercept the sealed envelope, open the envelope to view the contents, and use an identical envelope to the original, sealing the identical envelope and addressing it similarly to the original envelope for delivery to the recipient.

It is not practical to use an electronic locking mechanism for a reusable container such as an envelope. Existing electronic locking mechanism use wires or locks that complicate the locking process, are large and bulky, and are typically expensive, destroying any advantages of using a reusable container. Additionally, commonly used containers such as cardboard boxes, zipped containers, bottles, medication containers, and other similarly sized and shaped containers are not easily used with a typical electronic locking mechanism. Many containers, such as medication containers, use a breakable seal such as a paper or plastic seal to indicate the container has been inspected and sealed by the manufacturer. However, the breakable seals are easily duplicated and the containers may be tampered with during transportation, unbeknownst to the recipient. Additionally, unless replaced each time the container is opened, a breakable seal only provides an indication that a container has been opened, it does not provide an indication of how many times the container has been opened (e.g., has the container been opened once or ten times).

SUMMARY

In one general respect, the embodiments disclose a container. The container includes a closure member configured to detachably affix to a portion of the container, thereby sealing the container; a signal generating component configured to generate an electronic signal when the closure member is manipulated to open or close the container; and a circuit operably connected to the signal generating component and configured to receive the electronic signal. The circuit includes a processing device configured to generate a unique code when the closure member is manipulated to open or close the container and an output device operably connected to the processing device and configured to output the unique code.

In another general respect, the embodiments disclose a system including a container and a recording apparatus. The container includes a closure member configured to detachably affix to a portion of the container, thereby sealing the container, a signal generating component configured to generate an electronic signal when the closure member is manipulated to open or close the container, and a circuit operably connected to the signal generating component and configured to receive the electronic signal. The circuit includes a processing device configured to generate a unique code when the closure member is manipulated to open or close the container and an output device operably connected to the processing device and configured to output the unique code. The recording apparatus is configured to receive and display the unique code for verifying the unique code when the container is opened.

In another general respect, the embodiments disclose a method of securing a container. The method includes receiving a first signal at a processing device, the first signal being indicative of a closure member being manipulated to open or close the container; generating a first unique code at the processing device in response to receiving the first signal; outputting the first unique code by an output device; receiving a second signal at the processing device, the second signal being indicative of a closure member being manipulated to open or close the container; generating the first unique code at the processing device in response to receiving the second signal; and outputting the first unique code at an output device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The present disclosure relates to an apparatus for mounting on a container and configured to electronically record the opening and closing of the container. For example, the apparatus may be used for the opening and closing of envelopes, reusable bags with zippers, reusable packages with buckles and snaps, reusable jars, and other similar containers that are used in delivering, transporting and storing items in which contents should remain confidential or secure. The apparatus provides an indication of whether the container has been opened since an item was placed inside and the container was sealed.

Figure 1:
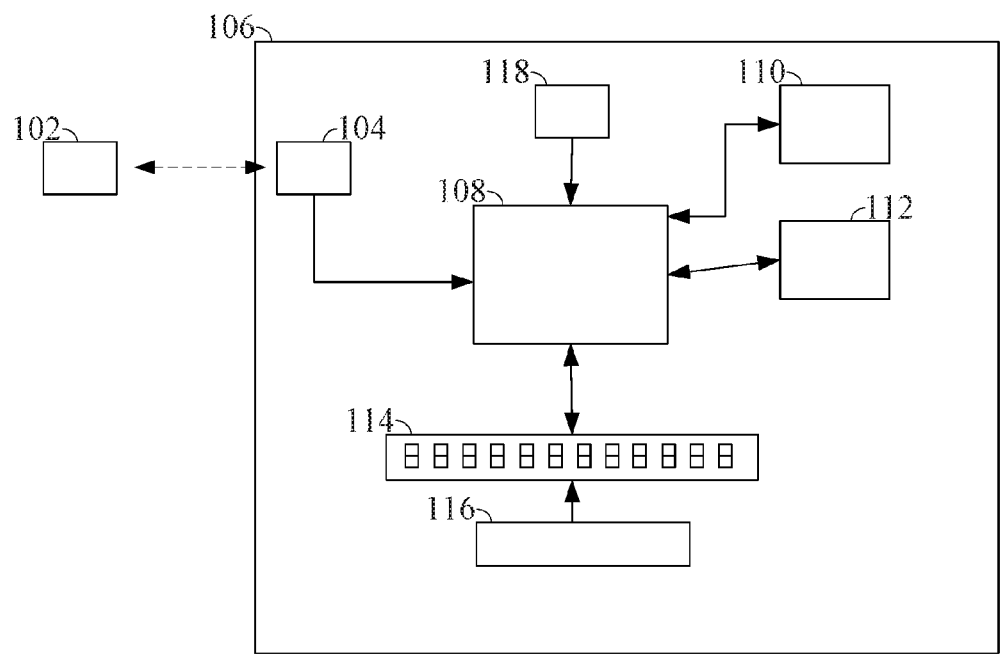
FIG. 1 shows an illustrative apparatus for providing a reusable electronic seal.

FIG. 1 shows an illustrative apparatus 100 for providing a reusable electronic seal for mounting on a reusable container such as an envelope. The apparatus 100 may include a closure member including first closure component 102 and second closure component 104. The first closure component 102 may be positioned on a sealing feature of the container to be sealed. For example, on a reusable envelope, the first closure component 102 may be positioned on a flap of the envelope. The second closure component 104 may be fixed on the container such that, when the sealing feature is positioned to seal the container, the first closure component 102 detachably affixes to the second closure component. Conversely, when the container is opened, the first closure member 102 may detach from the second closure member 104.

The first closure component 102 and the second closure component 104 may be shaped such that when fitted together, a resistive force opposed their separation. For example, the first closure component 102 may include a cylindrical protrusion. The second closure component 104 may include a cylindrical recess shaped to receive the cylindrical protrusion of the first closure member 102.

The second closure component 104 may be mounted on a mounting substrate 106. For example, mounting substrate 106 may be a printed circuit board (PCB) including various copper traces for providing electrical connections between the various components mounted thereon. The second closure component 104 may be operably connected to a processing device 108 such as a central processing unit (CPU). The second closure component 104 may be configured to generate and transmit a signal to the processing device 108 when the first closure component comes into contact with the second closure component, thereby indicating that the container has been sealed. Similarly, the second closure component 104 may generate and transmit a signal to the processing device 108 when contact between the first closure component 102 and the second closure component is broken, thereby indicating that the container has been opened.

The processing device 108 may be operably connected to a non-transitory computer readable memory 110 that is configured to store information related to the container as well as instructions for causing the processing device to perform various operations. The processing device 108 may also be connected to an input/output (I/O) interface 112 that is configured to output information to another computing device related to the operation of apparatus 100. The I/O interface 112 may include a plug or similar electrical connector for operably connecting a computing device to the processing device 108. The I/O interface 112 may also be configured to wirelessly connect to another computer device via a wireless data transfer protocol such as Bluetooth® or IEEE 802.11n. Information such as software updates may be downloaded onto the processing device 108 via the I/O interface 112.

A display 114 may be operably connected to the processing device 108 and configured to output information related to the operation of the apparatus 100. As shown in FIG. 1, the display 114 may be a liquid crystal display (LCD) including a plurality of seven-segment display elements configured to display standard characters. Alternatively, the display 114 may be a pixelated array configured to display characters and images. A user input interface 116 may be operably connected to the display 114, the user input interface including one or more input devices such as buttons, a touchscreen, switches, or other similar input devices that a user may manipulate to input information related to the container or apparatus 100. Each of the components mounted on the mounting substrate 106 may be powered by a power supply 118, such as a replaceable battery.

In order to provide protection, various components such as the processing device 108 and the memory 110 on the mounting substrate 106 may be covered or otherwise enclosed in plastic, ceramic, glass, or another sealing material. The second closure member 104, the display 114 and the user input interface 116 may be exposed so that they can be accessed during use of the apparatus 100 and so that they can provide access to power supply 118 for replacing a dead battery. The I/O interface 112 may be partially exposed such that any plug or other similar connector may be accessed by a user of the apparatus 100. If the I/O interface 112 is solely limited to wireless communication, the I/O interface may also be enclosed for protection. Similarly, a removable cover may be provided for covering the apparatus 100, thereby protecting the various components mounted on the mounting substrate 106.

Figure 2:
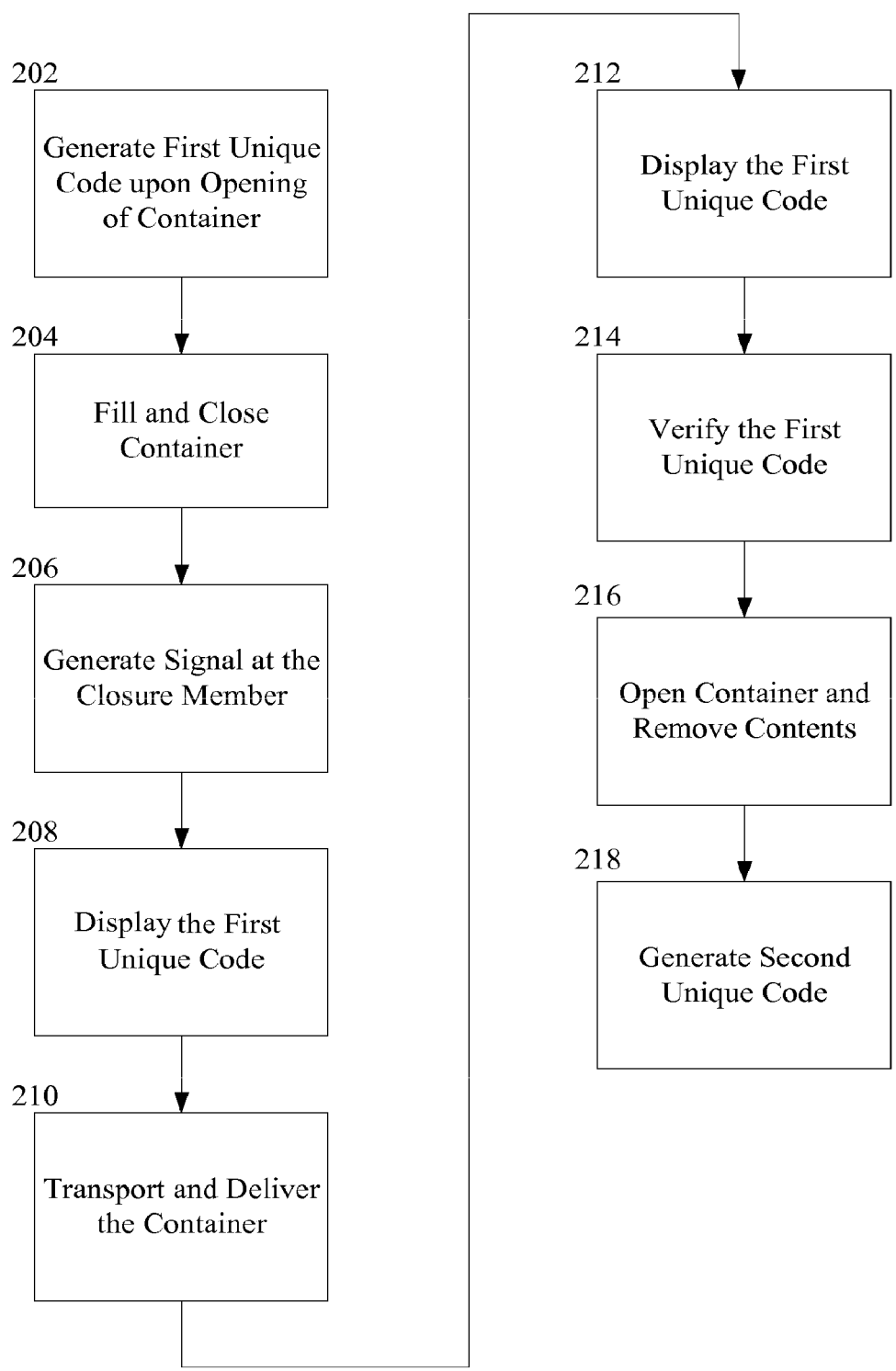
FIG. 2 shows an illustrative process for using a reusable electronic seal such as the apparatus as shown in FIG. 1.

FIG. 2 shows an illustrative process for using a reusable electronic seal, such as apparatus 100 as shown in FIG. 1, mounted on a reusable container such as a multi-use envelope. It should be noted that components in FIG. 1 are referenced by way of example only, and the process as shown in FIG. 2 may be applied to additional apparatuses other than apparatus 100.

Upon opening the container, a first unique code may be generated 202 by the processing device 108. The unique code may include a random number generated by the processing device 108 (or a dedicated random number generator) concatenated with additional information such as date, time, sender information and other pertinent information related to the container. A user of the container may enter this information manually via the user input interface 116 or via an external computing device operably connected via the I/O interface 112. The information entered by the user may be received by the processing device 108 and stored in the memory 110. The processing device 108 may be programed to store the unique code locally in processor-based memory, or in a database in the memory 110. Additionally, the memory 110 may be configured to store information related to department addresses (for inter-office mail), phone numbers, instructions for a recipient, and other related information.

The sender of the container may fill and close 204 the container. To close 204 the container, the sender may manipulate the first closure component 102 such that it engages the second closure component 104, thereby causing the second closure member to generate 206 a signal and transmit the signal to the processing device 108, where the signal indicates that the container has been closed. The processing device may then cause the unique code to be displayed 208 on the display 114. The unique code may be displayed 208 for a certain period of time to conserve power. For example, the unique code may be displayed 208 for 1 minute after the container is closed. To redisplay the unique code, a user may press a button on the user input interface 116, thereby causing the processing device 108 to display 208 the unique code for another period of time.

While the unique code is displayed 208, the sender may opt to write down the code. The reusable envelope may include a listing for name and address/department of the recipient. The listing may further include an area for the sender to write in the unique code. Similarly, prior to closing 204 the container, the sender may cause the processing device 108 to display the unique code by pressing a button on the user input interface 116, write down the code displayed, and insert a slip into the envelope including the unique code.

The container may be transported and delivered 210 to the recipient. For example, in an office setting, an employee from the mailroom may pick up the container at the sender's desk, transport the container to the recipient's desk and deliver 210 the container to the recipient. Upon receipt, the recipient may press a button on the user input interface 116 to cause the processing device 108 to display 212 the first unique code generated 202 when the container was originally opened. Depending on the arrangement of the container, the recipient may verify 214 the unique code against the code the sender wrote on the recipient listing to verify the container has not been opened between the sender closing the container and the recipient receiving the container. Alternatively, the recipient may write down the displayed 212 first unique code for later verification 214 against the slip contained within the container.

The recipient may open 216 the container and remove the contents. When opened, the separation of the first closure component 102 and the second closure component 104 may cause the processing device to generate 218 a second unique code for use by the recipient (or another user) when the container is reused. If the first unique code was written on a slip and placed within the container, the recipient may verify 214 the unique code displayed 212 on the container when they received it after opening 216.

If, during the transportation of the container, the container was opened by someone other than the recipient, the unique code as displayed to the recipient upon receipt of the container will not match the unique code displayed to the sender. Upon noting this discrepancy, the recipient may notify the sender or other authorities such as a manager that the container was opened or otherwise tampered with during delivery.

In an alternative embodiment, the first unique code generated 202 may be electronically transmitted to the recipient prior to delivery of the package. For example, a delivery person may obtain the unique code from the container when they pick up the delivery. The code may be obtained by operably connected a tablet or other portable computing device to the electronic seal (e.g., via the I/O interface 112 as shown in FIG. 1) and retrieving the code form the processing device. Alternatively, the delivery person may manually enter the unique code into their computing device. The recipient may receive a message from the delivery company indicating the unique code as well as an estimated time of delivery. Depending on the receiving capabilities of the recipient, the unique code may be included in an email message, a text message (e.g., a short message system (SMS) message), displayed on a website associated with the delivery company and accessed via a recipient's account or tracking number, or delivered to the recipient via another electronic transmission. Upon receipt of the container, the recipient may verify 214 the unique code against the code they received from the delivery company prior to accepting delivery of the container.

It should be noted the process as shown in FIG. 2 is shown by way of example only. Additional process steps may be implemented, and process steps included in FIG. 2 may be altered or removed from another process. For example, the processing device may be configured to display additional information such as container access dates, container access times, identification information related to the sender or recipient, container access restriction information, stored item information, and other related information on the display at various times through the process.

Figure 3:
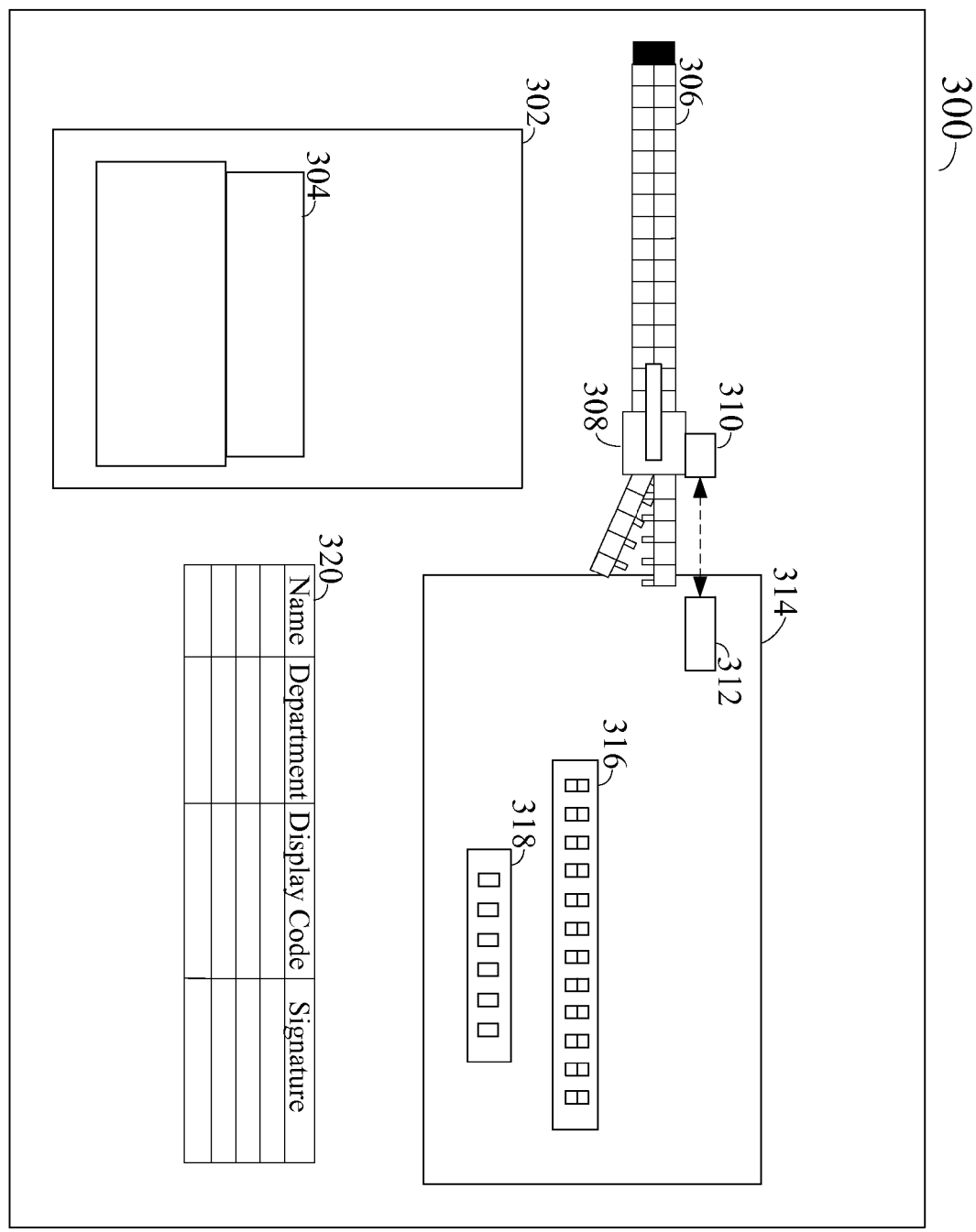
FIG. 3 shows an illustrative container including a reusable electronic seal such as the apparatus shown in FIG. 1.

FIG. 3 illustrates a specific container 300 incorporating a reusable electronic seal such as apparatus 100 as shown in FIG. 1. The container 300 may include an interior volume 302 configured to receive and hold various items 304. A zippered closure member 306 may be provided for opening and closing the container 300, thereby sealing the interior volume 302. It should be noted, however, that zipper 306 is shown by way of example only. Additional closure members such as an envelope flap, a screwed top, a strap with a buckle, one or more snaps, or other similar reusable closure members may be used.

The zipper 306 may include a pull 308 that, when manipulated, causes the zipper to open or close. The pull 308 may be operably connected to a first closure component 310 such that the first closure component moves in concert with the pull. When the zipper 306 is closed, the pull 308 may be at the right end of the zipper such that the first closure component 310 is contacting a second closure component 312. The second closure component 312 may be integrated into an electronic seal 314. Upon manipulation of the pull 308 to either open or close the zipper 306, the electronic seal 314 may display a unique code on a display 316. As before, the unique code may include a randomly generated number concatenated with additional information such as the date or the time. A user input interface 318 may allow a user of the container 300 to input additional information such as recipient information, sender information, information related to the content items 304, and other information. Similar to the discussion of FIG. 1, the information may be stored in a memory contained within the electronic seal 314 for access by the recipient.

The container may further include a recording apparatus for use in verifying the unique codes displayed by the electronic seal 314. For example, as shown in FIG. 3, the recording apparatus may include a listing 320 where the sender can enter various information including recipient's name, department and the unique code displayed by the electronic seal 314. The recipient, after verifying the unique code, may sign the listing 320, thereby confirming they received the container 300 and accept the content items 304 contained therein.

It should be noted the embodiments as shown in the figures are shown by way of example only. Additional changes/improvements to the embodiments as discussed herein may be made. For example, the zippered container 300 as shown in FIG. 3 is shown by way of example only. Additional containers may include, but are not limited to, a box, a jar, a shipping container, a courier container, a zip-lock container, a pill container, a bottle, a pressurized tank, a suitcase, a latched container, and other similar containers defining an interior volume configured to receive one or more items.

Example 1

Interoffice Communication

As noted above in reference to FIG. 2, a reusable electronic seal may be used to provide secure interoffice communication. A manager may want to send correspondence to one of his employees regarding their performance evaluation. The manager may use a multi-use envelope including a reusable electronic seal. Upon opening the envelope, a unique code is generated by the seal, the code including the date, time and a random number generated upon opening the envelope. The manager places the correspondence in the envelope, seals the envelope (and the electronic seal), and notes the unique code "2/13/12-1:45 PM-34929" that is displayed on the electronic seal. The manager fills out the recipient information block, writing the recipient's name, department and the unique code.

Upon delivery to the recipient, the recipient presses a button on the electronic seal and a unique code is displayed. The recipient compares the displayed unique code against the unique code written down by the manager. If the codes match, the recipient knows the envelope was not opened during delivery. If the code does not match, the recipient knows the envelope was opened during delivery. The recipient can write down the new unique code, noting the date and the time to determine when the envelope was opened during delivery.

Example 2

Medication Containers

In the medical field, shipments of drugs may be tampered with during transportation from a production facility to a distribution facility such as a hospital or a pharmacy. Prior to shipping, the drug containers may each be fitted with a reusable electronic seal as described herein. A shipping supervisor or other employee notes the unique codes on the electronic seals prior to shipping. The codes are recorded in a log book or other similar record, and are separately shipped to the same recipient as the drugs. By providing the codes in a separate shipment, this reduces the chances that someone intercepting the drug shipment may be able to falsify the listing of the codes.

Upon receipt of the drug shipment and the listing of the codes, the recipient (e.g., a pharmacist) verifies that the individual containers of drugs have not been tampered with by matching the unique codes. If the shipments have been tampered with, the pharmacist contacts the drug manufacturer and disposes of drugs accordingly.

The electronic seals also provide additional security for the pharmacies and hospitals to prevent internal theft. By confirming the unique codes each time they access the drugs, a pharmacist ensures that their supply has not been tampered with by an employee or customer.

Example 3

Verifying Goods for Auction

Various goods such as artwork, old documents, sports cards and collectables, and other similar collectables are often verified by an expert prior to being auctioned. In order to ensure authentication, after the collectible is authenticated by the expert, it is sealed in a container including an electronic seal as described herein. The unique code is noted and provided to the auctioneer or another person affiliated with the auction. As each item is brought up for auction, the auctioneer or other person affiliated with the auction verifies the electronic code displayed on the contained with the unique code noted when the collectible was authenticated. If the numbers do not match, the collectable may have been tampered with, and the auctioneer may opt to delay auctioning the collectible until further verification has been performed.

Similarly, after auction, a person who has bought a collectible may be provided with a unique code corresponding to a code displayed by an electronic seal on the container holding the collectible they purchased. The buyer can use this information to verify the container they receive after the auction has not been tampered with.

Example 4

Shipping Via a Delivery Service

Determining whether sensitive or classified materials have been tampered with is a common concern when using a delivery or courier service. Typically, shipments sent via a delivery service include standard packaging and printed labels that can easily be reproduced. A sender of the materials may include a reusable electronic seal when preparing a package for shipping via a delivery service. When creating the mailing label, the sender may have the option of including the unique code on the shipping label. Additionally, the sender may include contact information such as a mobile phone number or an email address for the recipient. An electronic message, such as an email or an SMS text message, may be transmitted to the recipient from the delivery service, the message including various information such as a package tracking number, an estimated delivery data and the unique code. Upon receiving the package, the recipient can compare the unique code currently displayed on the electronic seal against the one they received from the delivery service, thereby verifying the package has not been opened during transportation.

Similarly, upon picking up the package from the sender, a delivery person working for the delivery company may scan or otherwise obtain the unique code form the electronic seal onto a personal computing device. The delivery company can transmit an electronic message to the recipient as before, including similar information such as package tracking number, estimated delivery data and the unique code.

In this example, the recipient receives a copy of the unique code prior to the delivery company taking possession of the package. The sender can confirm the unique code obtained by the delivery company is correct prior to the delivery person taking the package, and the recipient can confirm the unique code currently associated with the package matches the original unique code prior to accepting delivery of the package.

During transportation, it may be necessary to open a container for an inspection. For example, during an international shipment, a customs officer may open the container to inspect the contents. When this occurs, an official update to a log or record associated with the container indicates when and where the container was opened, whether the unique code displayed when the container was opened matched the original unique code, and the new unique code displayed when the container was resealed. This provides the owner or recipient of the container with verification as to whether anyone other than an official or governmental entity such a customs officer opened the container during transportation.

Example 5

Short or Long-Term Storage

During transportation of a container, the container may sit in a warehouse or other storage area for an extended period of time. For example, a metal storage container may sit in an outdoor storage area adjacent a harbor or port prior to being loaded on a transport ship. During this short-term storage, the container may be tampered with and items stolen. Not until the recipient does a full inventory check would they notice that something may have been stolen.

Similarly, many transportation companies offer long-term storage of items. For example, a family may be moving to a new house. In the intervening time between packing their belongings and moving into their new dwelling, a transportation company may offer to store the items in one or more large storage containers. Again, like above, the containers may be tampered with during storage.

During packing of the storage containers, the sender of the containers includes an electronic seal as described herein. The sender notes the unique code displayed by the electronic seal when the container is sealed prior to shipping. The unique code may be recorded in a paper or electronic log associated with the container. If, at any time during storage, the container is opened, the unique code will change, and an owner or recipient of the container can verify the unique code prior to opening or accepting the container. If the unique code is unchanged, the owner or recipient knows the container was not tampered with during storage.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus operable as a reusable electronic seal for a container, the apparatus comprising:
   a closure member configured to detachably affix to a portion of the container, wherein the closure member is configured to be manipulated to open or close the container;
   a signal generator component configured to generate an electronic signal in response to manipulation of the closure member;
   a circuit operably coupled to the signal generator component and configured to receive the electronic signal, the circuit comprising:
      a processor device configured to generate a unique code responsive to the electronic signal, and
      an output device operably coupled to the processor device and configured to output the unique code so as to enable determination of whether the container has previously been opened; and
   a user interface operably coupled to the processor device and configured to receive input information and forward the input information to the processor device.

2. The apparatus of claim 1, wherein the processor device is further configured to:
   generate a first unique code in response to reception of the electronic signal, which indicates that the closure member is manipulated a first time;
   control the output device to display the first unique code after reception of the electronic signal that indicates the closure member is manipulated the first time;
   generate a second unique code in response to reception of the electronic signal, which further indicates that the closure member is manipulated a second time; and
   control the output device to display the second unique code after reception of the electronic signal that indicates the closure member is manipulated the second time.

3. The apparatus of claim 1, wherein the output device includes a display configured to display at least the unique code and additional information related to the container.

4. The apparatus of claim 1, wherein the output device is further configured to:
   establish an operable connection with a computing device; and
   transfer the unique code to the computing device via the operable connection.

5. The apparatus of claim 1, further comprising:
   a first connector operably coupled to the closure member; and
   a second connector configured to engage with the first connector in response to manipulation of the closure member.

6. The apparatus of claim 1, wherein the circuit further comprises a non-transitory computer readable medium operably coupled to the processor device and configured to store additional information related to the container.

7. The apparatus of claim 1, further comprising a non-transitory computer readable medium operably coupled to the processor device and configured to store the user input information.

8. The apparatus of claim 1, wherein the container comprises an interior volume configured to receive one or more articles, wherein the interior volume is sealed by the closure member after the closure member is manipulated into a closed position with respect to the interior volume.

9. The apparatus of claim 1, wherein the container includes at least one of an envelope, a box, a jar, a shipping container, a zipped container, a zip-lock container, a pill container, a bottle, a pressurized tank, a suitcase and a latched container.

10. An apparatus operable as a reusable electronic seal system, the apparatus comprising:
    a container comprising:
       a closure member configured to detachably affix to a portion of the container, wherein the closure member is configured to be manipulated to open or close the container;
       a signal generator component configured to generate an electronic signal in response to manipulation of the closure member; and
       a circuit operably coupled to the signal generator component and configured to receive the electronic signal, the circuit comprising:
          a processor device configured to generate a unique code responsive to the electronic signal, and
          an output device operably coupled to the processor device and configured to output the unique code;
    a user interface operably coupled to the processor device and configured to receive input information input and forward the input information to the processor device; and
    a recorder apparatus configured to receive and display the unique code such that the unique code is visible for verification after the container is opened.

11. The apparatus of claim 10, wherein the processor device is configured to:
    generate a first unique code in response to reception of the electronic signal, which indicates that the closure member is manipulated a first time;
    control the output device to display the first unique code after reception of the electronic signal that indicates the closure member is manipulated the first time;
    generate a second unique code in response to reception of the electronic signal, which further that indicates that the closure member is manipulated a second time; and
    control the output device to display the second unique code after reception of the electronic signal that indicates the closure member is manipulated the second time.

12. The apparatus of claim 10, wherein the output device includes a display configured to display the unique code and additional information related to the container.

13. The apparatus of claim 10, wherein the output device is further configured to:
    establish an operable connection with a computing device; and
    transfer the unique code to the computing device via the operable connection.

14. The apparatus of claim 10, further comprising:
    a first connector operably coupled to the closure member; and a second connector configured to engage with the first connector in response to manipulation of the closure member.

15. The apparatus of claim 10, wherein the circuit further comprises a non-transitory computer readable medium operably coupled to the processor device and configured to store information related to the container.

16. A method to operate a reusable electronic seal for a container, the method comprising:
   receiving a first signal at a processor device, the first signal being indicative of a closure member being manipulated a first time to open or close the container;
   generating a first unique code at the processor device in response to receiving the first signal;
   controlling an output device to display the first unique code;
   receiving a second signal at the processor device, the second signal being indicative of a closure member being manipulated to open or close the container;
   generating a second unique code at the processor device in response to receiving the second signal;
   controlling an output device to display the second unique code;
   receiving input information at a user interface operably coupled to the processor device; and
   forwarding the input information from the user interface to the processor device.

17. The method of claim 16, further comprising:
   generating a third unique code at the processor device in response to the container being opened or closed a second time; and
   controlling an output device to display the third unique code.

18. The method of claim 16, wherein controlling the output device to display the first unique code comprises displaying the first unique code on a display and displaying additional information related to the container.

19. The method of claim 16, wherein controlling the output device to display the first unique code comprises:
   establishing an operable connection between the output device and a computing device; and
   transferring the first unique code from the output device to the computing device.

20. The method of claim 16, further comprising storing the input information at a non-transitory computer readable medium operably coupled to the processor device.

21. The apparatus of claim 3, wherein the additional information comprises at least one of a date, a time, an address, a phone number, instructions for a recipient, and identification information related to: a sender, the recipient, a container access restriction, and an item stored in the container.

22. The apparatus of claim 6, wherein the additional information comprises at least one of a date, a time, an address, a phone number, instructions for a recipient, and identification information related to: a sender, the recipient, a container access restriction, and an item stored in the container.

23. The apparatus of claim 12, wherein the additional information comprises at least one of a date, a time, an address, a phone number, instructions for a recipient, and identification information related to: a sender, the recipient, a container access restriction, and an item stored in the container.

24. The method of claim 18, wherein the additional information comprises at least one of a date, a time, an address, a phone number, instructions for a recipient, and identification information related to: a sender, the recipient, a container access restriction, and an item stored in the container.

* * * * *